United States Patent
Nohren, Jr.

(10) Patent No.: US 6,193,886 B1
(45) Date of Patent: Feb. 27, 2001

(54) SUB-MICRON SPORT BOTTLE WITH CERAMIC FILTERING ELEMENT

(75) Inventor: John E. Nohren, Jr., Clearwater, FL (US)

(73) Assignee: Innova Pure Water Inc., Clearwater, FL (US)

( * ) Notice: Subject to any disclaimer, the term of this patent is extended or adjusted under 35 U.S.C. 154(b) by 0 days.

(21) Appl. No.: 09/132,312

(22) Filed: Aug. 11, 1998

(51) Int. Cl.[7] ....................................... B01D 35/02
(52) U.S. Cl. ................ 210/282; 210/469; 210/472; 210/506; 210/510.1; 222/189.08; 222/189.09
(58) Field of Search ................... 210/767, 232, 210/236, 238, 282, 459, 460, 461, 266, 472, 450, 506, 510.1, 469; 427/488; 501/80; 222/189.07, 189.08, 189.09

(56) References Cited

U.S. PATENT DOCUMENTS

| | | |
|---|---|---|
| 4,251,377 * | 2/1981 | Schleinitz . |
| 4,746,341 * | 5/1988 | Komoda ............................ 55/487 |
| 5,128,036 * | 7/1992 | Svensson ........................... 210/264 |
| 5,401,399 | 3/1995 | Magnusson et al. . |
| 5,431,813 * | 7/1995 | Daniels ............................. 210/282 |
| 5,609,759 | 3/1997 | Nohren, Jr. et al. . |
| 5,655,212 * | 8/1997 | Sekhar et al. .................... 428/552 |
| 5,681,463 * | 10/1997 | Shimizu et al. ................... 210/266 |
| 5,723,219 | 3/1998 | Kolluri et al. . |
| 5,914,045 * | 6/1999 | Palmer et al. .................... 210/694 |
| 5,919,365 * | 7/1999 | Collette . |
| 5,928,512 * | 7/1999 | Hatch et al. . |
| 6,010,626 * | 1/2000 | D'Agostino . |

FOREIGN PATENT DOCUMENTS 308877   9/1997   (NZ) .

* cited by examiner

Primary Examiner—Matthew O. Savage
Assistant Examiner—Terry K. Cecil
(74) Attorney, Agent, or Firm—Nixon & Vanderhye P.C.

(57) ABSTRACT

A ceramic filter assembly is provided for use in a bottle for filtering water exiting the bottle so as to remove substantially all protozoa and bacteria from the water. The assembly includes a self-supporting ceramic filtering material element having a pore size of about 0.55 microns or less (e.g. about 0.45 microns) yet having a large open volume (e.g. between 40–85%, preferably between 51–80%), so that water may pass through it at a rate of 2 milliliters per second or more (e.g. 3–6 milliliters per second) with an initial head pressure of no more than 24 inches of water, so that the water may readily be passed through the filter by inverting and/or squeezing the plastic bottle containing the filter. A second, non-ceramic, filter element (such as a carbon block filter for reducing chlorine) may be mounted within the ceramic filter element, and a positively charged coating may be provided on the external surface of the ceramic filter element capable of attracting and holding negatively charged viruses. Water can be removed from the bottle by attaching the filter assembly to a straw, or the filter assembly may be mounted to a cap having a manual valve.

21 Claims, 4 Drawing Sheets

SUB-MICRON SPORT BOTTLE WITH CERAMIC FILTERING ELEMENT

BACKGROUND AND SUMMARY OF THE INVENTION

A very successful filter for filtering tap water exiting a bottle is shown and described in U.S. Pat. No. 5,609,759 (the disclosure of which is hereby incorporated by reference herein). The carbon block element that is the preferred filtering material there is very effective in reducing the level of chlorine in the tap water, e.g. reducing the level of chlorine in water passing therethrough by at least 50% at a flow rate of 5 ml/sec., and the material also is capable of reducing the levels of some other contaminants. However the filter of the U.S. Pat. No. 5,609,759 patent essentially must be used with tap water, or another relatively pure source of water, because it is incapable of removing biological materials that can be hazardous to human health, such as protozoa, bacteria, and viruses. These biological contaminants have a very small size. For example protozoa are typically in the size range of 3 to 6 microns, and bacteria are normally about 0.6 microns or above in size. The materials used in the carbon block filter of the U.S. Pat. No. 5,609,759 patent cannot, with present technology, be made with a porosity low enough to effectively filter out biological materials. However ceramic materials, using present technology, can be made with a porosity low enough so as to effectively filter out biological materials.

Conventional ceramic anti-microbial filters for use with potentially contaminated water supplies use a pressurized flow of water (e.g. generated by a powered, or hand operated, pump) to develop sufficient pressure to force the water through the sub-micron ceramic filter. Viruses are typically eliminated by the addition of chlorine or iodine directly to the water prior to filtering, or by the addition of a biocidal media such as an iodated resin which functions as a contact biocide. It has not heretofore been practical to provide ceramic filters that are used in essentially unpressurized systems, that is systems with no more than about 24 inches of water head pressure, and therefore ceramic filters have not been suitable for use in sports bottles configurations, such as disclosed in U.S. Pat. No. 5,609,759.

According to the present invention a ceramic filter assembly is provided that is suitable for use in bottles, that is allowing effective filtering even with an initial head pressure of no more than about 24 inches of water. This is accomplished according to the present invention by utilizing a ceramic filtering element that has a pore size percentage which is significantly higher than in conventional pressurized systems. While in conventional pressurized systems the pore size percentage is rarely over about 20%, utilizing the ceramic filtering material in the ceramic filter assembly according to the invention the pore size percentage is between about 40–85%, typically over 50%. The pore size of the ceramic filtering material utilized according to the invention is typically about 0.55 microns or lower, desirably less than 0.5 microns, and optimally about 0.4–0.45 microns. With such a pore size, essentially all bacteria and protozoa cysts are removed by size exclusion alone. If bacteria filtering is not necessary, then the pore size can be opened up so that it is not greater than 3.0 microns.

Also according to the present invention it is highly desirable to provide for effective removal of viruses without requiring the use of chlorine, iodine, iodinated resins, or the like, which can significantly adversely affect the taste of the water. According to the invention the ceramic filter element may include a positively charged coating on the external surface thereof capable of attracting and holding negatively charged viruses, such as the plasma film layers according to U.S. Pat. No. 5,723,219 (the disclosure of which is hereby incorporated by reference herein).

The invention provides a relatively low coat yet effective mechanism for removal of bacteria and protozoa, and optionally viruses, which is convenient, readily usable, totally portable, and inexpensive compared to conventional products.

According to one aspect of the present invention a ceramic filter assembly for use with a bottle having a circular cross-section neck or open end to simultaneously cap the neck or open end, and filter liquid poured out of the bottle through the neck or open end is provided. The assembly comprises the following components: A self-supporting ceramic filtering material element, having a pore size of about 0.55 microns or less (e.g. less than 0.5 microns, for example about 0.4–0.45 microns), through which water may pass at a rate of 2 ml/sec. or more (e.g. about 3 ml/sec. or more, for example about 3–6 ml/sec.) with an initial head pressure of no more than about 24 inches of water, the element having first and second ends. A cap element operatively connected to the ceramic filtering material element first end, and having a liquid passage therein, so that water flows through the ceramic filtering element and is filtered, and then flows through the liquid passage. And, the cap element having surface manifestations that are cooperable with a bottle neck or open end to releasably connect the cap element to a bottle neck or open end, so that water may be dispensed from a bottle by passing from within a bottle through the ceramic filtering material element, and then through the cap element liquid passage, and out the bottle.

The ceramic filtering element material is preferably substantially tubular having an interior void volume with a first at least partially open end, and a second closed end, the first end operatively connected to the liquid passage. A manual valve, such as a conventional bicycle bottle reciprocating valve (i.e. a push-pull valve), may be connected to the cap element for selectively allowing or preventing passage of water through the liquid passage.

The ceramic filtering material preferably has an open volume of between 40–85%, typically over 50%, e.g. about 51–80%. It may be self-venting in use (that is not requiring a separate vent in the cap element), or a distinct vent may be provided in the cap element. The ceramic filtering material preferably comprises a binder and clay composition, which is proprietary product developed by and available from Water Protection, Inc. of Miami, Fla.

The filter assembly may further comprise a second filter element (or even more filter elements) comprising a substantially continuous body of activated carbon and binder capable of reducing by at least 50% (and typically over 80 or even over 90%) the chlorine in water passing therethrough. The second filter element may be disposed within the void volume of the ceramic filtering material element. Other filtering material that may be used in place of or in addition to the carbon block filter include a monolithic composite (which may include carbon) incorporating polymer extraction technology for the removal of lead, arsenic, and nuclear contamination, etc.

The cap element preferably has a first seal defining surface, and the ceramic filtering element has a second seal defining surface; and the second filter element has a third seal defining surface; and the invention further comprises at least first and second seal elements cooperating between the first and third seal surfaces, and the second and third seal surfaces, respectively, to allow replacement of the second filter element with respect to both the cap and the ceramic filtering element, while substantially preventing flow of liquid between the seal surfaces.

The ceramic filter element comprises an external surface, and the assembly according to the invention also preferably further comprises a positively charged coating on the external surface capable of attracting and holding negatively charged viruses. For example the positively charged coating comprises a plasma film comprising a first layer containing a first functional group and a second layer containing a second functional group (e.g. amines) which is deposited on at least one of the periphery and the interstitial spaces of the ceramic filter (such as shown in U.S. Pat. No. 5,723,219).

The assembly may also comprise a straw receptacle provided in the cap element and at least in part defining the liquid passage. Other details of the assembly, such as the particular mounting structure and the like, may be as provided in U.S. Pat. No. 5,609,759 or in co-pending application Ser. No. 09/008,845 filed Jan. 20, 1998 (the disclosure of which is also incorporated by reference herein).

According to another aspect of the present invention a method of filtering water containing dangerous biological material including bacteria and protozoa using a ceramic filter element mounted in a bottle having an open end, is provided. The method comprises: (a) Placing water containing dangerous biological material including bacteria and protozoa into the bottle. And, (b) using only human generated pressure, causing the water to flow through the ceramic filter element out of the bottle open end at a rate of at least about 2 ml/sec, the ceramic filter element removing substantially all bacteria and protozoa from the water. In the practice of the method, (b) is typically practiced by inverting the bottle so that the open end thereof is near the bottom, squeezing the bottle, or both inverting and squeezing the bottle, dispensing of the water in this manner being possible because of the relatively large open volume (e.g. between about 40–85%) of the ceramic filter so that a non-pressurized system (e.g. one requiring no more than about 24 inches of water initial head pressure) is provided. Alternatively (b) may be practiced by placing a straw into the bottle separated from the water containing dangerous biological material by the ceramic filter, and sucking through the straw. Typically the ceramic filter has a positively charged porous coating as described above, in which case (b) is also practiced to cause the water to flow through the coating so that negatively charged viruses in the water are removed by the coating.

The method may also be practiced utilizing a tubular filter as the ceramic filter, the tubular filter having a void volume therein, and also using a second non-ceramic filter element for removing other materials from the water aside from dangerous biological material. In that case the method further comprises (c) removing the existing ceramic filter element and second filter from the bottle; (d) removing the existing second filter from the ceramic filter element; (e) replacing the second filter with a new second filter; (f) placing the new second filter into the existing ceramic filter; and (g) reinstalling the existing ceramic filter element, with new second filter, into the bottle. (c) through (g) may be repeated between 4–about 10 times before the existing ceramic filter is replaced with a new ceramic filter. For example where the second filter is a carbon block filter for reducing the level of chlorine in the water by at least about 50%, the carbon block filter may be replaced about every 30–60 gallons, while the ceramic filter is replaced about every 250 gallons.

According to another aspect of the present invention a bottle with filter assembly is provided comprising: A plastic bottle having an open end. A cap closing the open end and having a closable liquid passage therein. A filter assembly operatively and removably connected to the cap and disposed within the bottle so that water from the bottle must flow through the filter assembly before passing out the cap. The filter assembly comprising a first tubular outer filter element of a first filtering capability and longevity, and a second inner filter element of a second filtering capability and a second longevity, the second longevity less than the first longevity. And, the first and second filter elements being readily detachable from the cap so that the second filter element can be replaced with a new second filter element, and then the first filter element with new second filter element reinstalled into operative contact with the cap and returned to the bottle. In the assembly described above, the cap preferably has a first seal defining surface, and the first filter element has a second seal defining surface, and the second filter element has a third seal defining surface. The assembly also further comprises at least first and second seal elements cooperating between the first and third seal surfaces, and the second and third seal surfaces, respectively, to allow replacement of the second filter element with respect to both the cap and the first filter element, while substantially preventing flow of liquid between the seal surfaces. The first and second seal elements typically comprise O-rings.

According to yet another aspect of the present invention a ceramic filter assembly for use in a bottle having an opening, and insertable through the opening, is provided. The assembly comprises: A self-supporting ceramic filtering material having a pore size capable of filtering substantially all protozoa and bacteria out of water and an open volume of greater than about 50%. And, a mounting structure which mounts the filter material in a bottle so that water passes through the filter material as the water exits the bottle. The assembly further comprises a hydrophilicity enhancing coating on at least one portion of the ceramic filtering material (e.g. the external surface thereof), the coating preferably comprising a plasma film such as described in U.S. Pat. No. 5,723,219. Typically the ceramic filtering material comprises a binder and clay composition having a pore size of about 0.5 microns or less, and an open volume of between about 51–80% (and each particular value therebetween).

It is the primary object of the present invention to provide an effective, readily usable, convenient, totally portable, and relatively inexpensive filter assembly for dealing with biological materials. This and other objects of the invention will become clear from an inspection of the detailed description of the invention and from the appended claims.

BRIEF DESCRIPTION OF THE DRAWINGS

FIG. 6 is a view like that of FIGS. 2 and 3 of yet another embodiment.

DETAILED DESCRIPTION OF THE DRAWINGS

Figure 1:
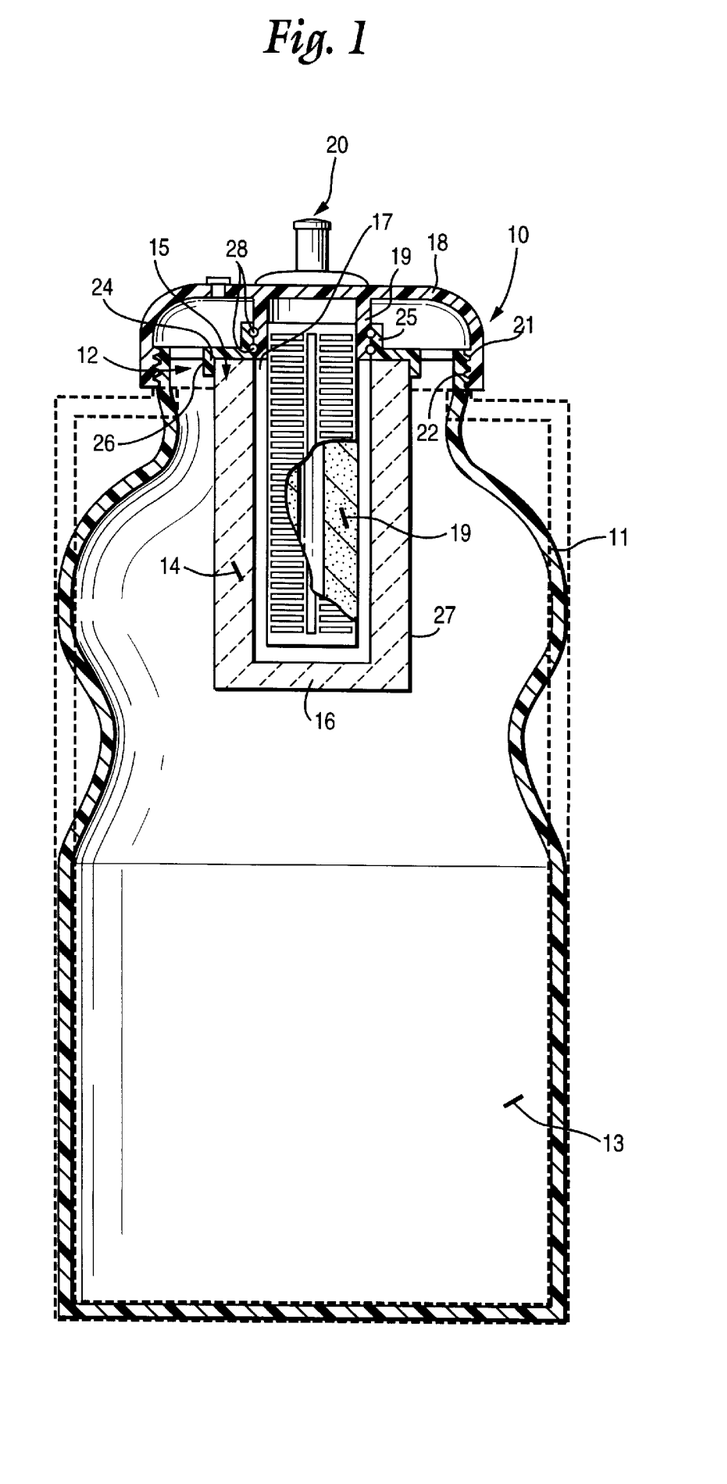
FIG. 1 is a side view, partly in cross-section and partly in elevation, of an exemplary ceramic filter assembly in combination with a bottle, according to the present invention.

One embodiment of a ceramic filtering assembly according to the present invention is shown schematically at 10 in FIG. 1, for use in combination with a bottle 11 having a circular cross-section neck or open end 12. The bottle 11 may be a conventional sport or bicycle bottle, such as of a squeezable plastic material so that squeezing of the bottle 11 assists in expelling water from the hollow interior 13 thereof. The ceramic filter assembly 10 simultaneously caps the neck or open end 12 and filters water moving out of the bottle 11 through the neck or open end 12.

The ceramic filter assembly 10 includes as a major component thereof a self-supporting ceramic filtering material element 14 which is preferably cylindrical, tubular, or prismatic in configuration, preferably tubular. The pore size of the filtering material 14 if only protozoa is to be filtered is 3.0 microns or less. However where bacterial and other biological materials are to be filtered, the pore size of the ceramic filter 14 is about 0.55 microns or less, typically 0.5 microns or less, e.g. about 0.4–0.45 microns, so that it is capable of filtering substantially all protozoa and bacteria out of water passing through the filter 14. The filter 14 allows water to pass therethrough at a rate of 2 ml/sec. or more (e.g. 3 ml/sec. or more, typically about 3–6 ml/sec.) with an initial head pressure of no more than about 24 inches of water. That is the filtering element 14 need not be part of a pressurized system, but rather merely upon inverting of the bottle 11, and/or squeezing of the bottle 11, sufficient head pressure is provided for the water so that it can pass through the filtering material 14 at a rate of at least 2 ml/sec. This is preferably accomplished by providing the ceramic filtering material 14 with an open volume of between 40–85%, typically over 50%, e.g. about 51–80%. The preferred ceramic filtering material comprises a proprietary binder and clay composition available from Water Protection, Inc. of Miami, Fla.

The ceramic filtering material element 14 includes a first end 15, and a second end 16. In the embodiment actually illustrated, an interior void volume is provided within the element 14 since it is tubular. The second end 16 is closed and an opening 17 is formed in the first end 15.

The assembly 10 illustrated in FIG. 1 also includes a cap element 18 operatively engaging (e.g. connected to) the ceramic filtering element first end 15. The cap element has a liquid passage therein, such as defined by the ring 19 extending downwardly from the inner surface of the cap element 18, and a manual valve 20, such as a conventional reciprocating bicycle bottle valve (i.e. a push-pull valve) 20. When the valve 20 is open, water flows through the liquid passage defined by the ring 19 and the valve 20 after it is filtered by the filter element 14.

The cap element 18 has surface manifestations that are cooperable with the bottle neck or open end 12 to releasably connect the cap element 18 to the bottle neck or open end 12, so that water may be dispensed from the bottle 11 by passing from within the bottle 11 through the element 14 and then through the cap element 18 liquid passage, and out of the bottle. The surface manifestations, shown only schematically at 21 in FIG. 1, preferably comprise internal screw threads which cooperate with external screw threads 22 on the bottle neck 12. Any other suitable surface manifestations for performing the function may be provided, however, such as those illustrated in U.S. Pat. No. 5,609,759 and co-pending application Ser. No. 09/008,845 filed Jan. 20, 1998. In addition the liquid passage may be defined by other elements aside from the ring 19 and manual valve 20 as long as they are suitable for performing the ultimate desired function.

In the embodiment illustrated in FIG. 1, the operative connection between the cap 18 and the filter element 14 comprises a mounting cap 24 having a first diameter portion 25 which seals with the exterior of the ring 19, and a second diameter portion 26 which tightly frictionally engages the external surface 27 of the element 14. Two spaced O-rings 28, or like seal-enhancing mechanisms, are preferably provided between the ring 19 external surface and the mounting cap portion 25 internal surface to ensure a positive liquid seal so that any water exiting the cap 18 through the valve 20 must pass through the filter element 14. Other suitable mounting mechanisms may be utilized, however, such as disclosed in U.S. Pat. No. 5,609,759 and/or co-pending application Ser. No. 09/008,845 filed Jan. 20, 1998.

In the embodiment illustrated in FIG. 1, a second filter element 29 is provided within the hollow interior 17 of the ceramic element 14. The inner element 29 is optional, and may comprise any other suitable non-ceramic filtering material. One particularly desirable material is a carbon block material (that is a substantially continuous body of activated carbon and binder) 29 such as described in U.S. Pat. No. 5,609,759 and co-pending application Ser. No. 09/008,845 filed Jan. 20, 1998. That carbon block material 29 is capable of reducing the level of chlorine in the water passing therethrough by at least 50% (and typically greater than 80% or even greater than 90%) at the flow rate at which the water passes through the element 14 (e.g. about 2–6 ml/sec.). The substantially continuous body of activated carbon and binder may also include other filtering materials therein, such as polymer extraction technology which is capable of substantially removing lead, arsenic, and nuclear contaminants. Other suitable materials may also be provided as described and depending upon the contaminants expected in any particular water source. A plurality of different tubes or cores of different filtering materials may also be provided in the open space 17 as opposed to the single tubular or core element 28 illustrated in FIG. 1.

In subsequent figures components substantially the same as those in FIG. 1 are illustrated by the same reference numeral whereas modifications thereof are illustrated by the same two digit reference numeral only preceded by a third number.

Figure 2:
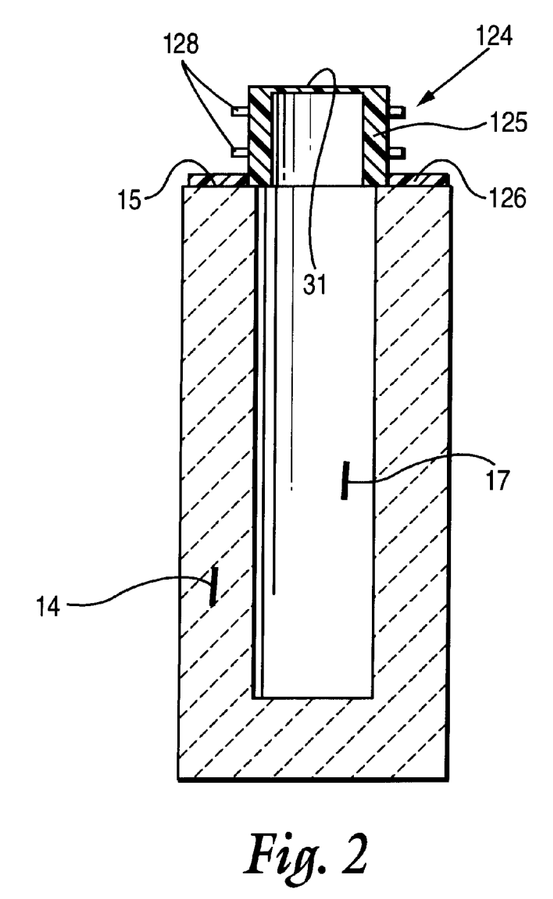
FIG. 2 is a side cross-sectional view of an exemplary ceramic filter utilizable in an assembly according to the present invention.

In the FIG. 2 embodiment, the ceramic filter element 14 is substantially the same as in FIG. 1, but it has a different mounting structure 124. The mounting structure 124 includes a flange 126 adhesively or otherwise substantially permanently adhered to the first end 15 of the element 14, and a smaller diameter portion 125 which is adapted to be received within a tube mounted to some sort of a cap structure (such as the cap element 18 of FIG. 1). Elastomeric seal rings (i.e. O-rings) 128 are provided on the exterior of the portion 125 to effect a water tight seal with a tube from the cap element. The "top" end of the mount 124 may be open, or as schematically illustrated in FIG. 2 is closed by a highly porous flange or membrane 31.

Figure 3:
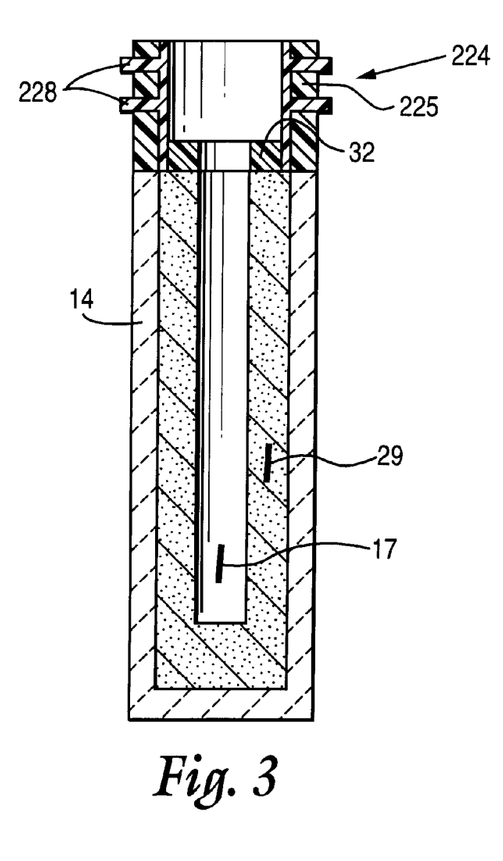
FIG. 3 is a view like that of FIG. 2 of another exemplary filter assembly according to the invention.

FIG. 3 differs from FIG. 1 again only in the mounting structure 224. In this case the mounting structure 224 is a non-porous tube ring-shaped, e.g. of a hard plastic, 225 having substantially the same inner and outer diameters as the ceramic filter element 14 with O-rings 228 on the exterior thereof for cooperation with a tubular mounting element or the like on a cap or other mounting structure associated with a bottle. To hold the carbon block filter element 29 in place, a plastic washer 32 or the like which makes an interference fit with the interior surface of the mounting ring 225 is provided. Ring 225 holds the carbon block filter 29 within the open interior 17 of the filter element 14, yet allows replacement thereof by the user grasping and pulling up on the washer 32.

Figure 4:
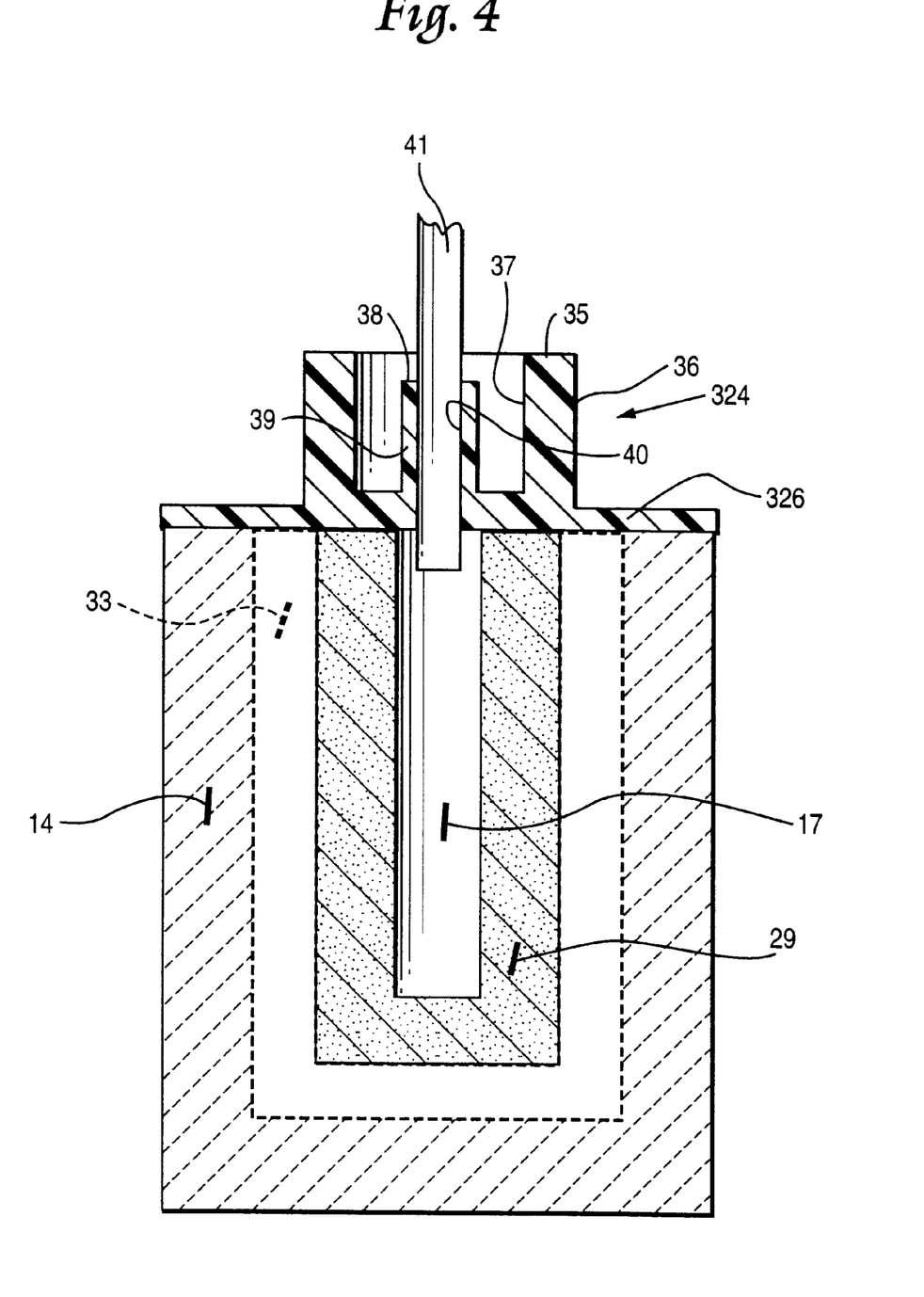
FIG. 4 is a view like that of FIGS. 2 and 3 of yet another exemplary ceramic filter assembly according to the invention.

In the embodiment of FIG. 4, an additional tubular filter element 33—in addition to the ceramic element 14 and the carbon block element 29—is provided which may be of any suitable material, including PEXT™ technology available from Innova Pure Water Inc. of Clearwater, Fla. In the FIG. 4 embodiment the mount 334 is designed to accommodate both substantially direct mounting to a cap (like the cap element 18 in FIG. 1) or mounting to a straw in a conventional type of sport bottle having a straw (such as shown in U.S. Pat. No. 5,401,399 of Magnusson et al). That is the mounting structure 324 has a flange part 326 which is adhesively secured, or releasably secured, by any suitable water tight mechanism, to the ceramic filter element 14, and has upstanding therefrom a first tubular member 35 having an exterior surface 36 and an interior surface 37, and a second tubular member 38 having an exterior tubular surface 39 and an interior tubular surface 40. Either one or both of the surfaces 36, 37 can be received by a cooperating surface on a cap element, and/or the surface 39 can also be received by a cooperating surface on a cap element, such as the cap element 18 of FIG. 1. Either the interior surface 40 or the exterior surface 39, also can receive, or be received by, respectively, a drinking straw, such as a plastic drinking straw 41 schematically illustrated in FIG. 4. The dimensions and configurations of the surfaces 39, 40 are such that they make a liquid tight seal with the straw 41 so that liquid passes through the straw 41 only by flowing to the interior void volume 17 within the filters 14, 29, 33.

Figure 5:
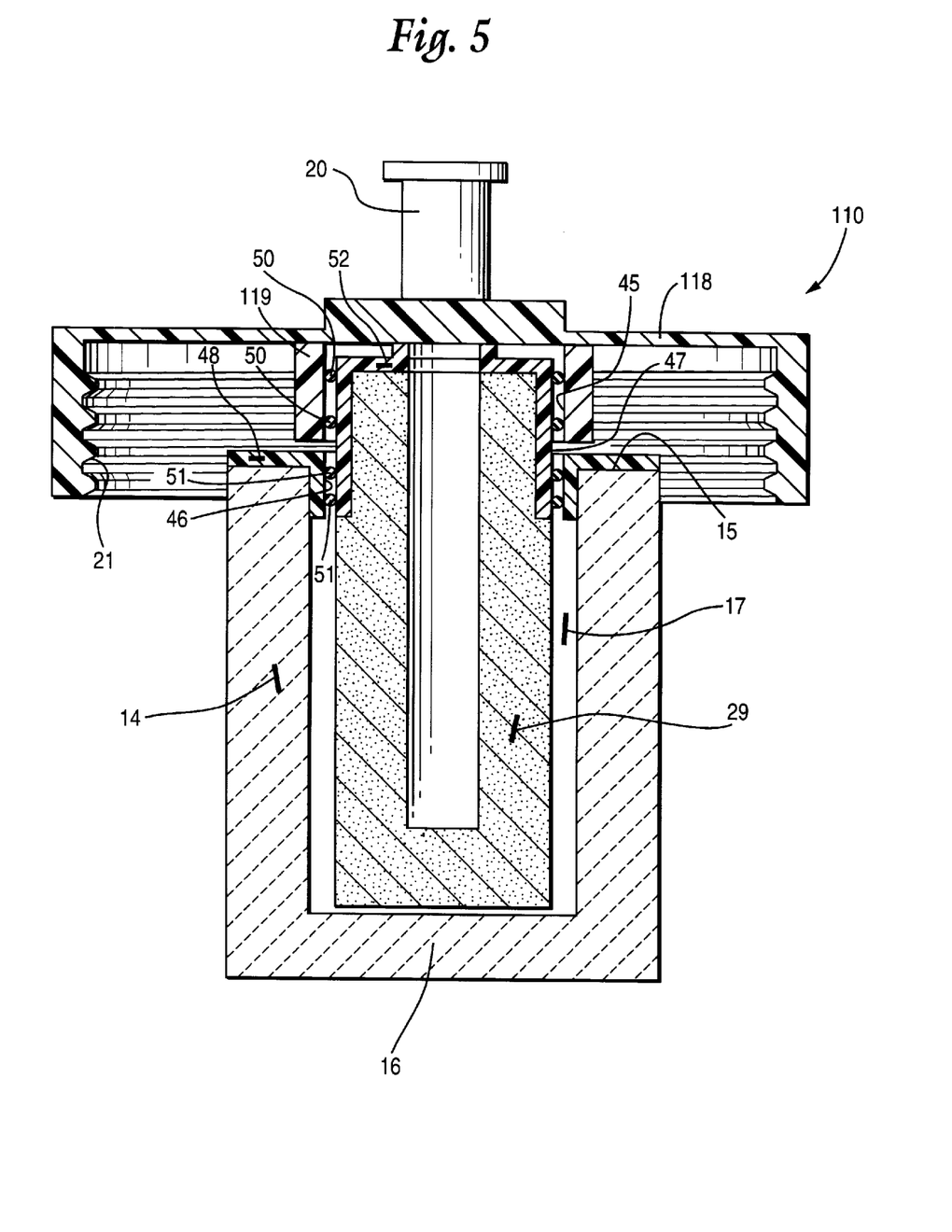
FIG. 5 is a view like that of FIG. 4 of yet another embodiment of a ceramic filtering assembly according to the invention, in this case including a bottle cap with a push-pull valve as a part thereof.

In the FIG. 5 embodiment, a ceramic filter assembly 110 is provided which allows even more ready removability of the interior (e.g. carbon block) replaceable filter element 29 than in the FIG. 2 embodiment. In this embodiment the cap 118 has a first seal defining surface 45, and the ceramic filtering element 14 has a second seal defining surface 46, while the carbon block filter element has a third seal defining surface 47. Typically the surfaces 45, 46 have approximately the same diameter and are inner surfaces of plastic components such as the edge protecting plastic flange 48 at the first end 15 of the ceramic element 14, and the plastic tubular element 119 extending downwardly from the bottom surface of the cap element 118. The assembly 110 of FIG. 5 further comprises at least a first seal element 50 cooperating between the surfaces 45, 47 to provide a liquid tight seal therebetween, and at least a second seal element 51 cooperating between the surfaces 46, 47 to provide another substantially liquid tight seal therebetween. In the exemplary embodiment illustrated in FIG. 5 the first seal element comprises a pair of elastomeric seal elements (O-rings), and likewise the second seal element 51 comprises a second pair of O-rings. Grooves (not shown) may be provided in the surfaces 45, 46, 47, for facilitating mounting of the components together, but preferably the O-rings 50, 51 are ultrasonically welded or otherwise attached to the surface 47.

Utilizing the assembly 110 of FIG. 5, it is relatively easy to replace the carbon block filter element 29, which needs to be replaced about 4–10 times during the life of the ceramic element 14 (e.g. the element 29 typically is used to filter 30–60 gallons before replacement, while the element 14 is capable of filtering about 250 gallons before it is no longer effective). With the FIG. 5 embodiment, after the cap 118 has been unscrewed from the bottle, the ceramic filter element 14 is grasped and a force is exerted thereon large enough to overcome one or both of sealing forces of the rings 50, 51 with their cooperating surfaces 45, 46. For example if the rings 50 detach from the surface 45, then one grasps the upper portion of the filter element 29 and pulls upwardly—while holding the ceramic filter 14 steady—to detach the rings 51. The new filter element 29 that is moved into place can either fit inside a mounting cap 52 defining the surface 47, or—more desirably—the new filter 29 includes the cap 52 with new O-rings 50, 51. The assembly 110 is easily reassembled by moving the O-rings 50 into contact with the surface 45, and then the O-rings 51 into contact with the surface 56, or vice versa.

FIG. 6 illustrates an embodiment in which the external surface 27 of the ceramic filter element 14, including the closed bottom 16, is provided with a positively charged coating capable of attracting and holding negatively charged viruses. In the preferred embodiment illustrated in FIG. 6, the coating 55 is also a hydrophilicity enhancing coating. While the coating 55 is preferably provided on the external surface 27 as illustrated in FIG. 6, it is provided on at least one surface of the element 14 that is expected to come into contact with water contaminated with viruses.

The preferred coating 55 is a plasma film comprising a first layer containing a first functional group and a second layer containing a second functional group which is deposited on at least one of the periphery in the interstitial spaces of the ceramic filter 14. Such a plasma film is described in detail, as well as its method of application, in U.S. Pat. No. 5,723,219 which has been incorporated by reference herein, and preferably utilizes amine groups.

In the FIG. 6 embodiment, an alternative mounting arrangement is also illustrated for mounting the filter element 14. Any of the other filter mount arrangements illustrated in the drawings, described above, and that are conventional, may be provided with the filter element 14 having the coating 55. In the FIG. 6 embodiment a drop in flange 56 is provided which may or may not have an O-ring or like elastomeric sealing element 57 on the bottom surface thereof, and which seals with a surface of the bottle which it is brought into contact with. Alternatively the flange 56 may cooperate with a structure such as illustrated in FIGS. 9 and 10 of U.S. Pat. No. 5,609,759.

As an alternative to any of the mounts or seals provided above, permanent mounts or seals may be provided, such as by ultrasonically welding, or adhesively attaching, components together.

A desirable method of filtering water containing dangerous biological material, including bacteria and protozoa and possibly viruses, may be provided according to the invention using the ceramic filter element 14 mounted in a bottle 11 having an open end 12. The method comprises (a) placing water containing the dangerous biological material into the bottle 11, and (b) using only direct human-generated pressure (e.g. sucking or inverting and squeezing, not hand pumping), causing the water to flow through the ceramic filter element 14 out of the bottle open end 12 at a rate of at least about 2 ml/sec. (preferably at least 3 ml/sec., e.g. about 3–6 ml/sec.), the ceramic filter element removing substantially all bacteria and protozoa from the water. Preferably (b) is practiced by inverting the bottle so that the open end 12 is near the bottom, squeezing the bottle 11, or both inverting and squeezing the bottle 11; or (b) may be practiced by placing a plastic drinking straw 41 into the bottle separated from the water containing the dangerous biological material by the ceramic filter (as seen in FIG. 4), and sucking through the straw 41. The filter element 14 preferably has an external surface 27 with a positively charged porous coating 55, in which case (b) is practiced to cause the water to flow through the coating 55 so that negatively charged viruses in the water are removed by the coating 55.

The method may also comprise—with reference to FIG. 5—(c) removing the existing ceramic filter element 14 and a second filter element 29 from the bottle 11 (as by unscrewing the cap 118), (d) removing the existing second filter element 29 from the ceramic filter element 14, (e) replacing the second filter 29 with a new second filter 29, (f) placing the new second filter 29 into the existing ceramic filter 14, and (g) reinstalling the existing ceramic filter element 14, with a new second filter 29, into the bottle 11, by screwing on the cap 11. Typically (c)–(g) are repeated between 4 about 10 times before the existing ceramic filter element 14 is replaced with a new ceramic filter element 14.

Additionally, according to the present invention a carbon block filter, such as a filter 29, may be treated utilizing the plasma film technique and structures of U.S. Pat. No. 5,723,219 so as to substantially completely remove viruses from water being filtered. For example by using amine groups as at least one of the functional groups providing a plasma film coating, a conventional carbon block filter having about 30–50% activated carbon and the rest plastic binder, and a porosity of about 40–60 microns, was coated with a plasma film according to the U.S. Pat. No. 5,723,219 patent, containing amine groups, with resulting measured densities of approximately 1.5 micromoles per gram, and that retained the high positive charge even after subsequent extensive washing.

It will thus be seen that according to the present invention a filter assembly is provided which is effective at the removal of biological contaminants, yet is convenient, readily usable, totally portable, and relatively inexpensive. While the invention has been herein shown and described in what is presently conceived to be the most practical and preferred embodiments thereof it will be apparent to those of ordinary skill in the art that many modifications may be made thereof within the scope of the invention, which scope is to be accorded the broadest interpretation of the appended so as to encompass all equivalent structures and methods.

What is claimed is:

1. A ceramic filter assembly for use with a portable bottle having a circular cross-section neck or open end to simultaneously cap the neck or open end, and filter liquid moving out of the bottle through the neck or open end, comprising:

a self-supporting ceramic filtering material element, having a pore size of about 0.55 microns or less, through which water may pass at a rate of 2 ml/sec. or more with an initial head pressure of no more than about 24 inches of water, said element having first and second ends and an open volume of between 40–85%;

a cap element operatively connected to said ceramic filtering material element first end, and having a liquid passage therein, so that water flows through said ceramic filtering element and is filtered, and then flows through said liquid passage; and said cap element having surface manifestations that are cooperable with a portable bottle neck or open end to releasably connect the cap element to a portable bottle neck or open end, so that water may be dispensed from a bottle by passing from within a portable bottle through said ceramic filtering material element, and then through said cap element liquid passage, and out the portable bottle.

2. A ceramic filter assembly as recited in claim 1 wherein said ceramic filtering element material is substantially tubular, having an interior void volume with a first at least partially open end, and a second closed end, said first end operatively connected to said liquid passage.

3. A ceramic filter assembly as recited in claim 2 wherein said ceramic filtering material has a pore size of about 0.4–0.45 microns, being capable of filtering substantially all protozoa and bacteria out of water.

4. A ceramic filter assembly as recited in claim 2 further comprising a manual valve connected to said cap element for selectively allowing or preventing passage of water through said liquid passage.

5. A ceramic filter assembly as recited in claim 4 wherein said manual valve comprises a push-pull valve.

6. A ceramic filter assembly as recited in claim 2 further comprising a second filter element comprising a substantially continuous body of activated carbon and binder capable of reducing by at least 50% the chlorine in water passing therethrough, said second filter element disposed within said void volume of said ceramic filtering material element.

7. A ceramic filter assembly as recited in claim 6 wherein said cap element has a first seal defining surface, and said ceramic filtering element has a second seal defining surface; and wherein said second filter element has a third seal defining surface; and further comprising at least first and second seal elements cooperating between said first and third seal surfaces, and said second and third seal surfaces, respectively, to allow replacement of said second filter element with respect to both said cap and said ceramic filtering element, while substantially preventing flow of liquid between said seal surfaces.

8. A ceramic filter assembly as recited in claim 2 wherein said ceramic filtering material is self-venting in use.

9. A ceramic filter assembly as recited in claim 2 further comprising a second non-ceramic filter element, comprising a substantially continuous porous body, disposed within said void volume, and filtering water passing between said ceramic filter element and said liquid passage.

10. A ceramic filter assembly as recited in claim 1 wherein said ceramic filtering material comprises a binder and clay composition having an open volume of between 51–85%.

11. A ceramic filter assembly as recited in claim 10 wherein said ceramic filter element comprises an external surface; and further comprising a positively charged coating on said external surface capable of attracting and holding negatively charged viruses.

12. A ceramic filter assembly as recited in claim 11 wherein said positively charged coating also enhances the hydrophilicity of said filter, and comprises a plasma film comprising a first layer containing a first functional group and a second layer containing a second functional group which is deposited on at least one of the periphery and the interstitial spaces of said ceramic filter.

13. A ceramic filter assembly as recited in claim 10 further comprising a straw receptacle provided in said cap element and at least in part defining said liquid passage.

14. A ceramic filter assembly as recited in claim 1 wherein said ceramic filter element comprises an external surface; and further comprising a positively charged coating on said external surface capable of attracting and holding negatively charged viruses.

15. A ceramic filter assembly as recited in claim 14 wherein said ceramic filter has a periphery and interstitial spaces; and wherein said positively charged coating also enhances the hydrophilicity of said filter, and comprises a plasma film comprising a first layer containing a first functional group and a second layer containing a second functional group which is deposited on at least one of the periphery and the interstitial spaces of said ceramic filter.

16. A ceramic filter assembly as recited in claim 1 wherein said filtering material has a pore size capable of filtering substantially all protozoa and bacteria out of water and an open volume of greater than about 50%.

17. A ceramic filter assembly as recited in claim 16 further comprising a hydrophilicity enhancing coating on at least one portion of said ceramic filtering material, said coating comprising a first layer containing a first functional amine group and a second layer containing a second functional amine group which is deposited on at least one of the periphery and the interstitial spaces of said ceramic filter.

18. A ceramic filter assembly as recited in claim 16 wherein said ceramic filtering material comprises a binder and clay composition having a pore size of about 0.5 microns or less.

19. A ceramic filter assembly as recited in claim 1 further comprising a straw receptacle provided in said cap element and at least in part defining said liquid passage.

20. A ceramic filter assembly as recited in claim 1 further comprising a manual valve connected to said cap element for selectively allowing or preventing passage of water through said liquid passage.

21. A ceramic filter assembly as recited in claim 1 wherein said ceramic filtering material has an open volume of between 51–85%, and is self-venting in use.

\* \* \* \* \*